(12) United States Patent  
Ebeling et al.

(10) Patent No.: US 8,721,253 B1  
(45) Date of Patent: May 13, 2014

(54) TRANSFER APPARATUS

(75) Inventors: Bruce James Ebeling, Waseca, MN (US); Jason Michael Binner, Red Wing, MN (US)

(73) Assignee: MRG Tool and Die Corp., Faribault, MN (US)

( * ) Notice: Subject to any disclaimer, the term of this patent is extended or adjusted under 35 U.S.C. 154(b) by 584 days.

(21) Appl. No.: 13/044,140

(22) Filed: Mar. 9, 2011

Related U.S. Application Data (60) Provisional application No. 61/312,355, filed on Mar. 10, 2010.

(51) Int. Cl.  
*E05B 47/00* (2006.01)  
*B25D 11/12* (2006.01)  
*B65G 49/00* (2006.01)

(52) U.S. Cl.  
USPC .......................................... 414/749.1; 74/57

(58) Field of Classification Search  
USPC ............ 414/749.1, 749.6; 74/490.07, 490.09, 74/490.13, 53, 55, 56, 567, 569, 57  
See application file for complete search history.

(56) References Cited

U.S. PATENT DOCUMENTS

| | | | | |
|---|---|---|---|---|
| 3,881,362 A * | 5/1975 | Beezer | ............................... | 74/53 |
| 4,155,272 A * | 5/1979 | Mosher | ...................... | 74/490.09 |
| 4,580,942 A * | 4/1986 | Miksch et al. | ............. | 414/749.1 |
| 4,599,909 A * | 7/1986 | Koller | ............................... | 74/27 |
| 6,098,478 A * | 8/2000 | Sandrock | .......................... | 74/53 |
| 6,134,981 A * | 10/2000 | Novak et al. | ............... | 74/490.09 |
| 7,581,459 B2 * | 9/2009 | Gourjon | ............................ | 74/55 |
| 2009/0044644 A1 * | 2/2009 | Hsieh et al. | ....................... | 74/55 |

* cited by examiner

*Primary Examiner* — Gregory Adams  
(74) *Attorney, Agent, or Firm* — Moore & Hansen, PLLC

(57) ABSTRACT

A transfer apparatus for moving an item from a first to a second location. The apparatus includes a base, a platform movably supported by the base, a bracket movably supported by the platform, a table, and at least one transfer unit movably connected to the platform and perpendicularly displaceable with respect thereto. The platform and bracket are each provided with a follower that is operatively connected to a cam, and both of the cams are connected to a single rotatable shaft. In operation the shaft, which is connected to a suitable motive source, rotates the cams, which reciprocally move the platform and bracket in a generally parallel directions. As the platform is moved by its cam, the transfer unit is displaced parallel to the base. As the bracket is moved by its cam, the bracket displaces the table perpendicularly to the base, which, in turn displaces the transfer unit perpendicularly to the platform.

24 Claims, 13 Drawing Sheets

TRANSFER APPARATUS

RELATED APPLICATION

This application claims priority to provisional U.S. Application Ser. No. 61/312,355, filed Mar. 10, 2010, titled Transfer Apparatus, herein incorporated by reference in its entirety.

BACKGROUND

This application relates generally to manufacturing. More particularly, this application relates to an apparatus used to sequentially advance an article from one location to another location.

Many manufacturing processes require numerous steps in order to achieve a final result. Such steps may require that an item be subjected to different manufacturing processes, such as drilling, threading, folding, stamping, etc., and then assembling the item to another item. Each of these steps may require a different, specialized machine that is located at a particular work station. In order to facilitate mass production, many work stations are automated and located in particular locations that according to their order of fabrication. In addition, many work stations are connected to each other by conveyors. Many conveyors are in the form of belts and rollers that take items from one work station and feed it to the next work station. These conveyors work well for most instances where the work stations are generally at the same level. However, there are instances where an item being worked on is required to be lifted, moved laterally and/or stacked. These operations require different transfer mechanisms than the usual conveyor belts and rollers.

A drawback with existing transfer mechanisms is that they are complicated and require many parts that have to be aligned precisely in order to operate as desired. Moreover, existing transfer mechanisms usually require periodic adjustments due to wear and tear. In addition, parts can become misaligned and reduce the operational effectiveness.

The transfer apparatus of this application overcomes drawbacks associated with existing prior art transfer mechanisms. It requires fewer moving parts, allows for precise positioning, is easy to operate, adjust and maintain, and significantly reduces the operating costs involved.

SUMMARY

In one embodiment, the transfer apparatus includes a base that supports a movable platform, which supports a movable table, which in turn, is operatively connected to a transfer unit. The platform and the table are connected to first and second cams, respectively, that are connected to a single shaft that is rotatably connected to a motive source. In operation, the first cam moves the platform and the transfer unit in a generally linear, reciprocal direction along an x coordinate in a conventional three-dimensional coordinate system. The second cam moves the moves the transfer unit in a generally linear, reciprocal direction along a y coordinate in a conventional three-dimensional coordinate system. The first and second cams are arranged so that the motion of the transfer unit in the x and y directions describe a generally vertically oriented angular circuit. A preferred circuit includes the steps of a positive vertical displacement, a horizontal extension, a negative vertical displacement and a horizontal retraction.

An advantage of this application is to provide a transfer apparatus that is easier to assemble and use than existing transfer mechanisms.

Another advantage of this application is to derive reciprocal horizontal and vertical motions through a single drive member.

Yet another advantage of this application is that the speed and duration of movements are infinitely variable.

A further advantage of the transfer apparatus is that horizontal and vertical motions are derived from cams that are connected to a single, rotatable shaft.

These and other objectives, features and advantages will appear more fully from the following description, made in conjunction with the accompanying drawings wherein like reference characters refer to the same or similar parts throughout the several views. And, although the disclosure hereof is detailed and exact, the physical embodiments herein disclosed are merely examples that may be embodied in other specific structures. While preferred embodiments have been described, the details may be changed without departing from the claims.

DESCRIPTION OF THE DRAWINGS

FIG. 1b is a partial, exploded, perspective view of the transfer apparatus of FIG. 1a;

FIG. 2a is a top plan view of the transfer apparatus of FIG. 1a;

FIG. 3a is a side elevational view of the transfer apparatus of FIG. 1a;

FIG. 4 is a partial, exploded, perspective view some of the components of the transfer apparatus of FIG. 1a;

FIG. 5 is a partial, exploded, perspective view of an embodiment of some of the components of a transfer unit of the transfer apparatus of FIG. 1a;

FIG. 7a is a partial, cross-sectional, side elevation view a table and a transfer unit of the transfer apparatus of FIG. 1a;

DETAILED DESCRIPTION

Figure 1A:
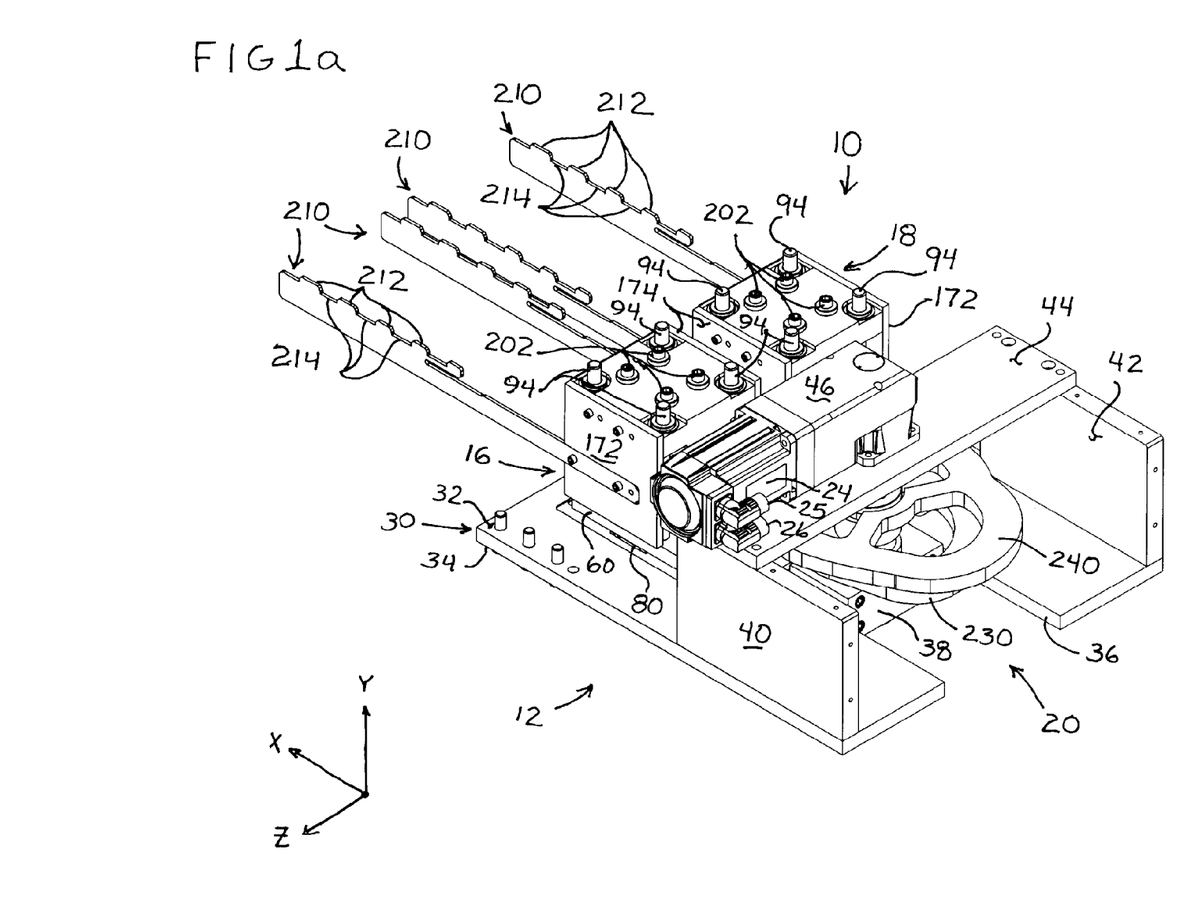
FIG. 1a is a perspective view of an embodiment of a transfer apparatus.
Figure 1B:
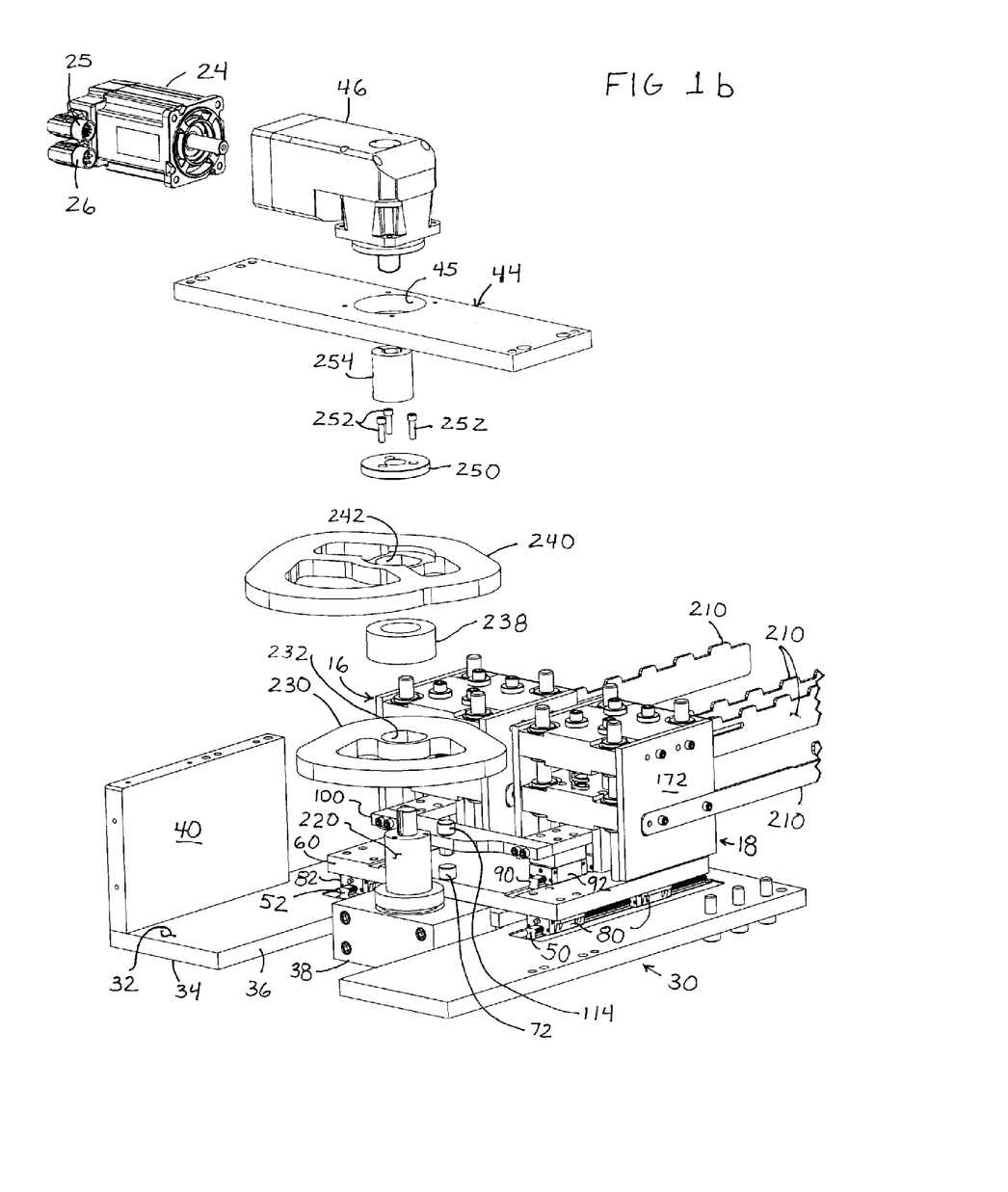
Figure 1C:
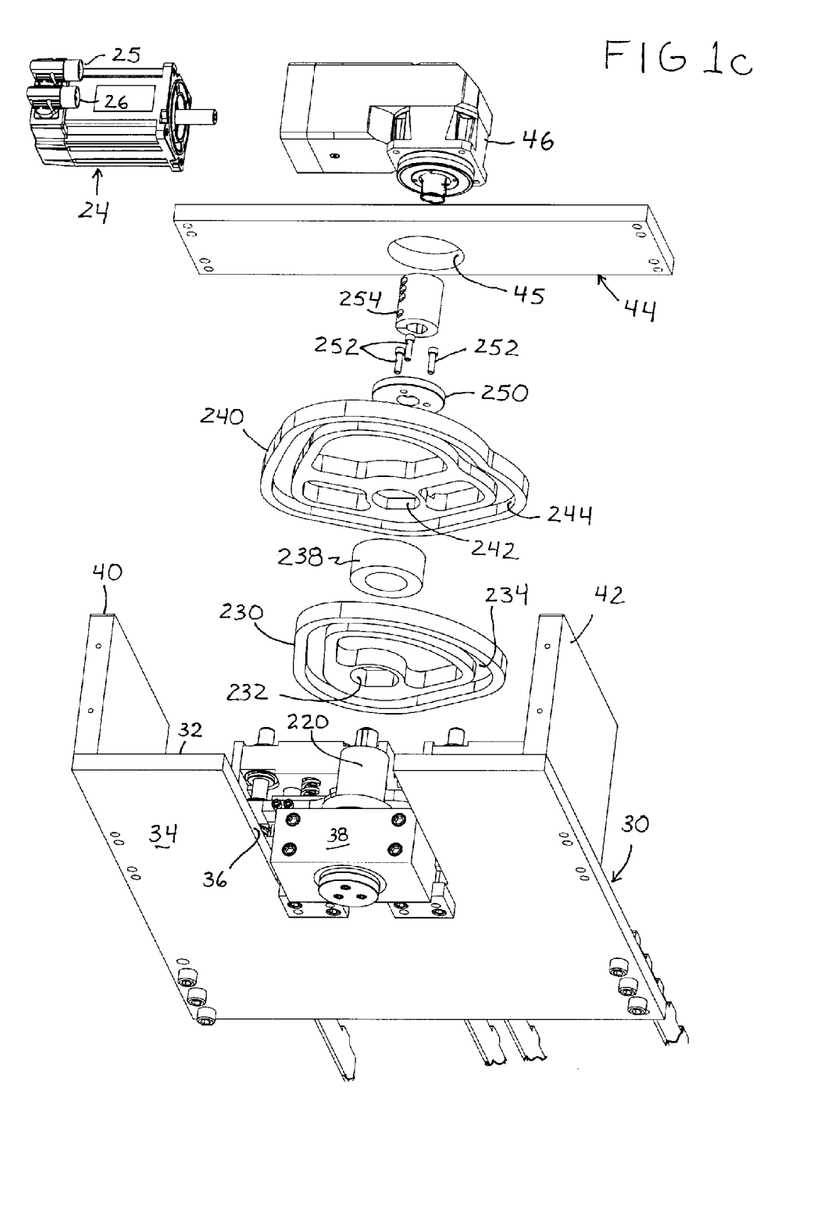
FIG. 1c is a partial, exploded, perspective view of the transfer apparatus of FIG. 1a, with the view taken from below and looking up.

Generally, one embodiment of the transfer apparatus 10 comprises a frame 12, transfer units 16, 18, and a drive assembly 20 that is operatively connected to a gearbox 46, which in turn is operatively connected to a motive source 24. Examples of commercially available gearboxes and electric servo motor that may be used with some of the embodiments of this apparatus are the Bayside RS90 right angle, and the Parker MPP0922R, both of which are manufactured by the Parker Hannifin Corporation, of Cleveland, Ohio. Note that the power and control cables have been omitted from their connection points 25 and 26 of the servo-motor. More specifically, and as best seen in FIGS. 1a, 1b and 1c, the frame 12 includes a base 30 having an upper or first surface 32, a lower or second surface 34, a front end, a rear end with a u-shaped cutout 36 that extends from the rear end towards the front end, and a lower or first bearing mount 38 that is removably connected to the frame within the cutout 36. Preferably, the upper surface of the base is generally horizontally oriented (along an x and z axes in a three-dimensional coordinate system) and the first and second bearing mounts are generally vertically oriented (along the y axis in a three-dimensional coordinate system). Note that for purposes of this application the term "front end" will correspond to the pointed end of an "X" directional arrow of a three-dimensional coordinate system indicator, while the term "rear end" will correspond to the tail of the "X" directional arrow of the three-dimensional coordinate system indicator. Continuing on, the base includes two rails 50, 52 that are attached to the first or upper surface 32, and are oriented to extend therealong from the front end to the rear end. The rails 50, 52 are configured and arranged to receive and support a movable platform 60 as it moves between a first horizontal position and a second horizontal position (see FIGS. 1b, 2c and 4). The frame 12 also includes a first side wall 40 and a second side wall 42 that are positioned along the sides of the cutout 36, to which a beam 44 is attached. The beam 44 provides an elevated support for an upper or second bearing mount that forms part of a right angle gearbox 46, the motive source 24, and one or more optional sensors (not shown) that can detect motion and position of the drive assembly 20. As will be understood and appreciated, the first bearing mount 38 and the gearbox 46 with its bearing mount may be adjusted horizontally relative to the front end rear ends of the base 30.

Figure 2A:
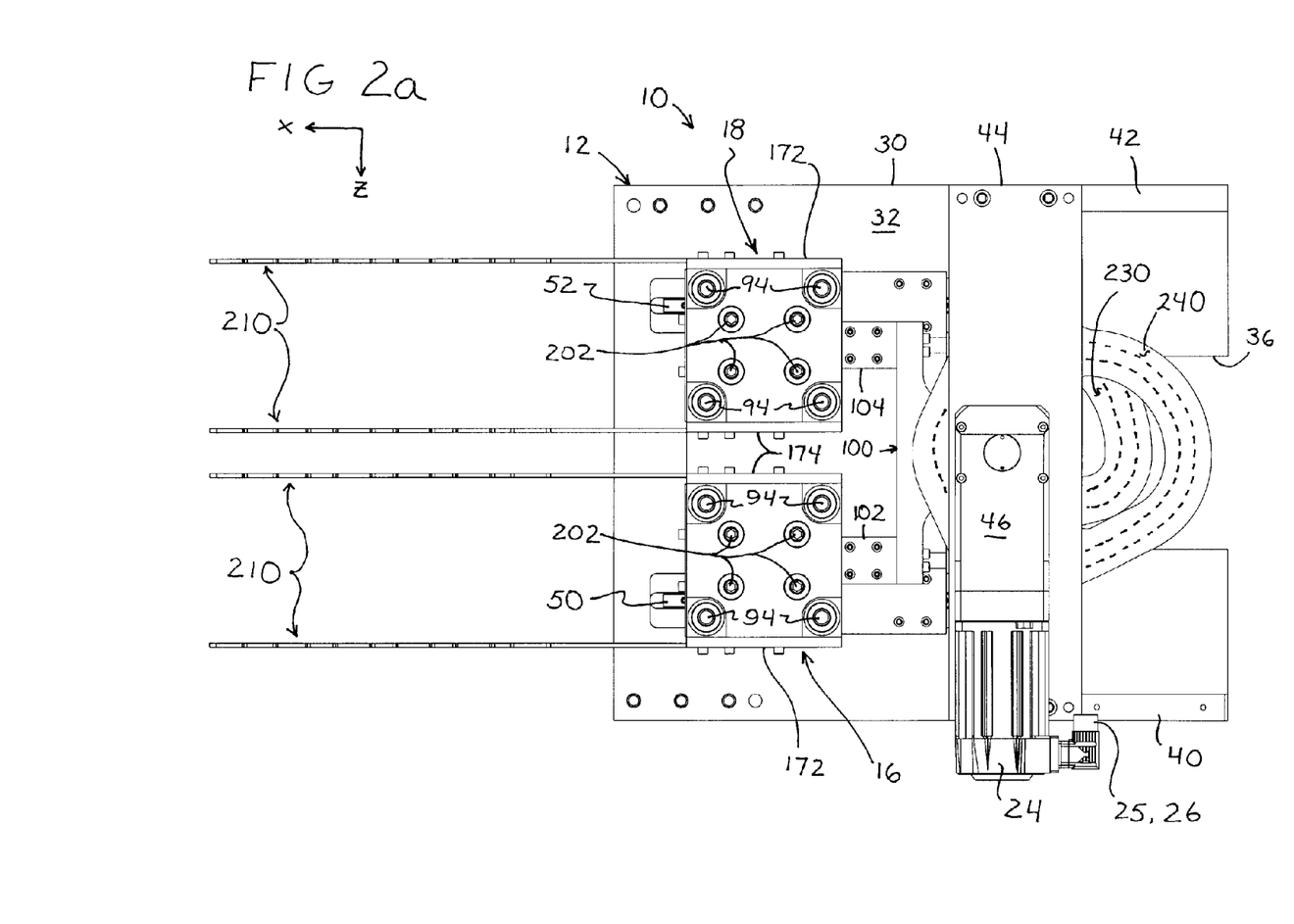
Figure 2B:
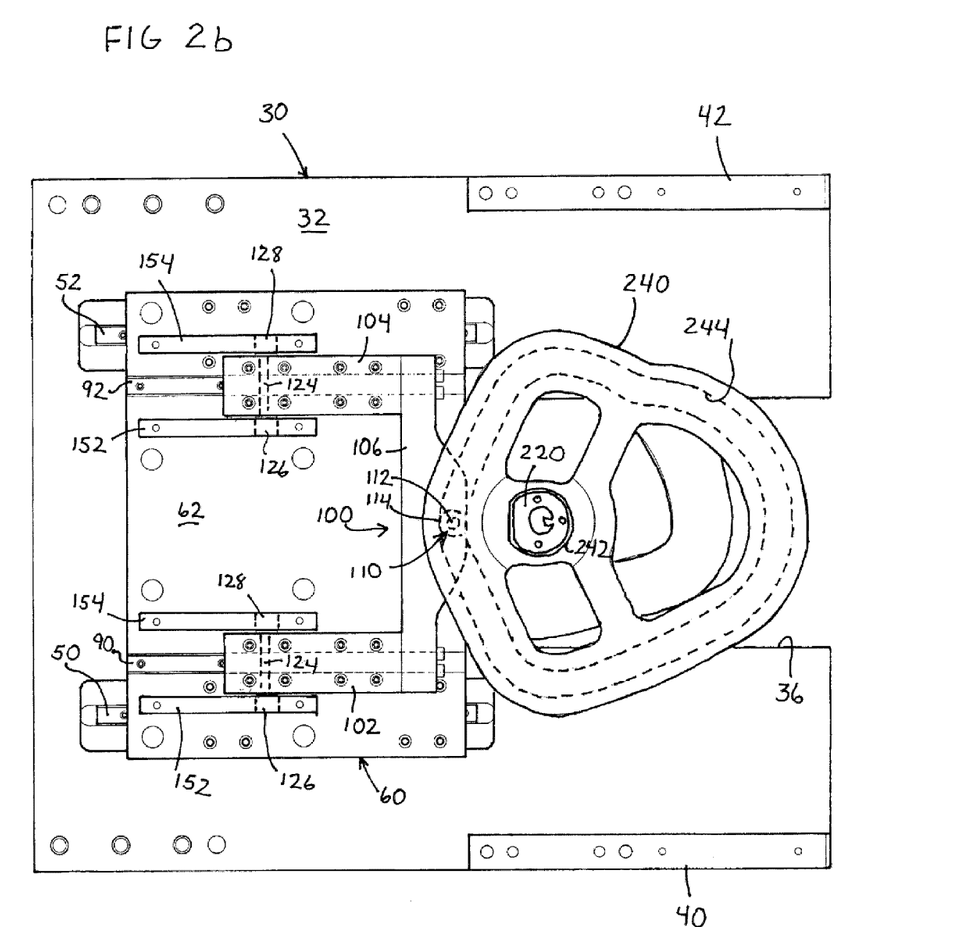
FIG. 2b is a partial, top plan view of FIG. 2a, with portions of the apparatus removed to reveal mid-level components of the apparatus.
Figure 2C:
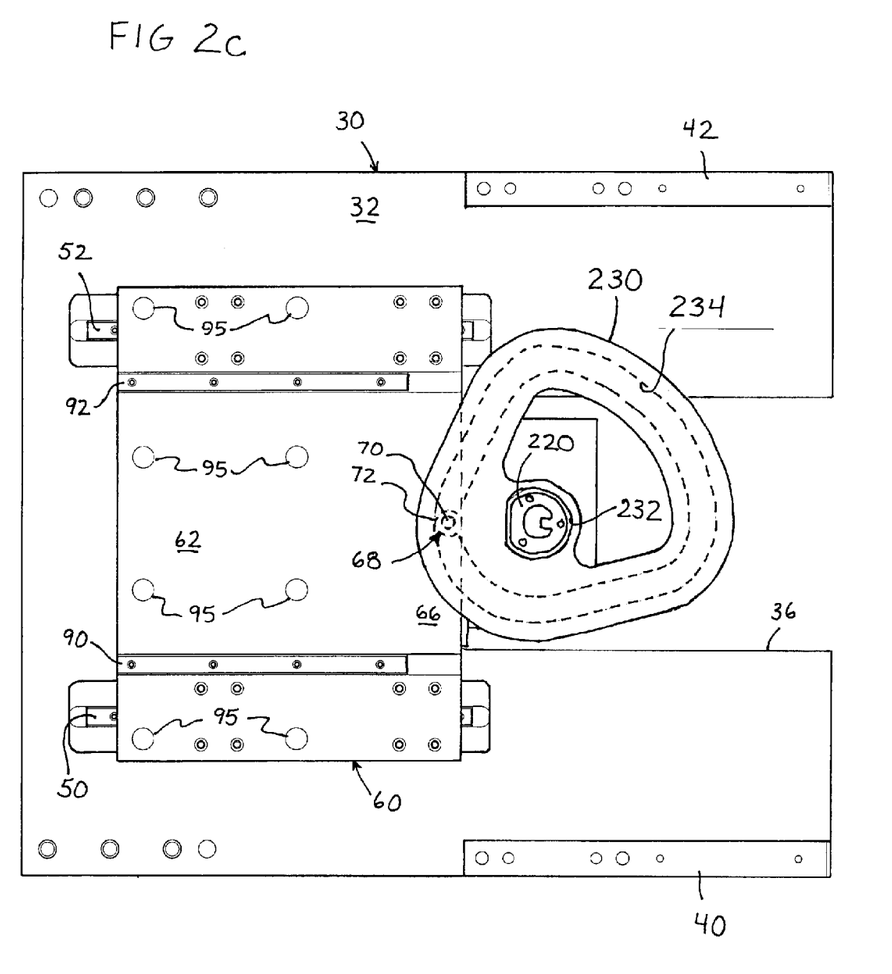
FIG. 2c is a partial, top plan view of FIG. 2b, with portion of the mid-level components removed to reveal lower-level components of the apparatus.

Referring to FIGS. 1b and 2c, the platform 60 is generally planar and includes a first or upper surface 62, a second or lower surface 64, a front end, a rear end, sides, and a rear extension 66. The second or lower surface 64 includes one or more rail engagement members 80, 82 that are configured and arranged to ride upon the rails 50, 52 of the base 30. The rail engagement members 80, 82 are bearings or friction reducing materials that permit the platform 60 to move smoothly relative to the base 30. Preferably, the rail engagement members 80, 82 are linear bearings. However, it will be appreciated that the rail engagement members could be friction reducing material such as nylon strips and/or lubricants. As will be understood, the particular number of rail engagement members used can be changed without departing from the spirit and scope of the invention.

Figure 4:
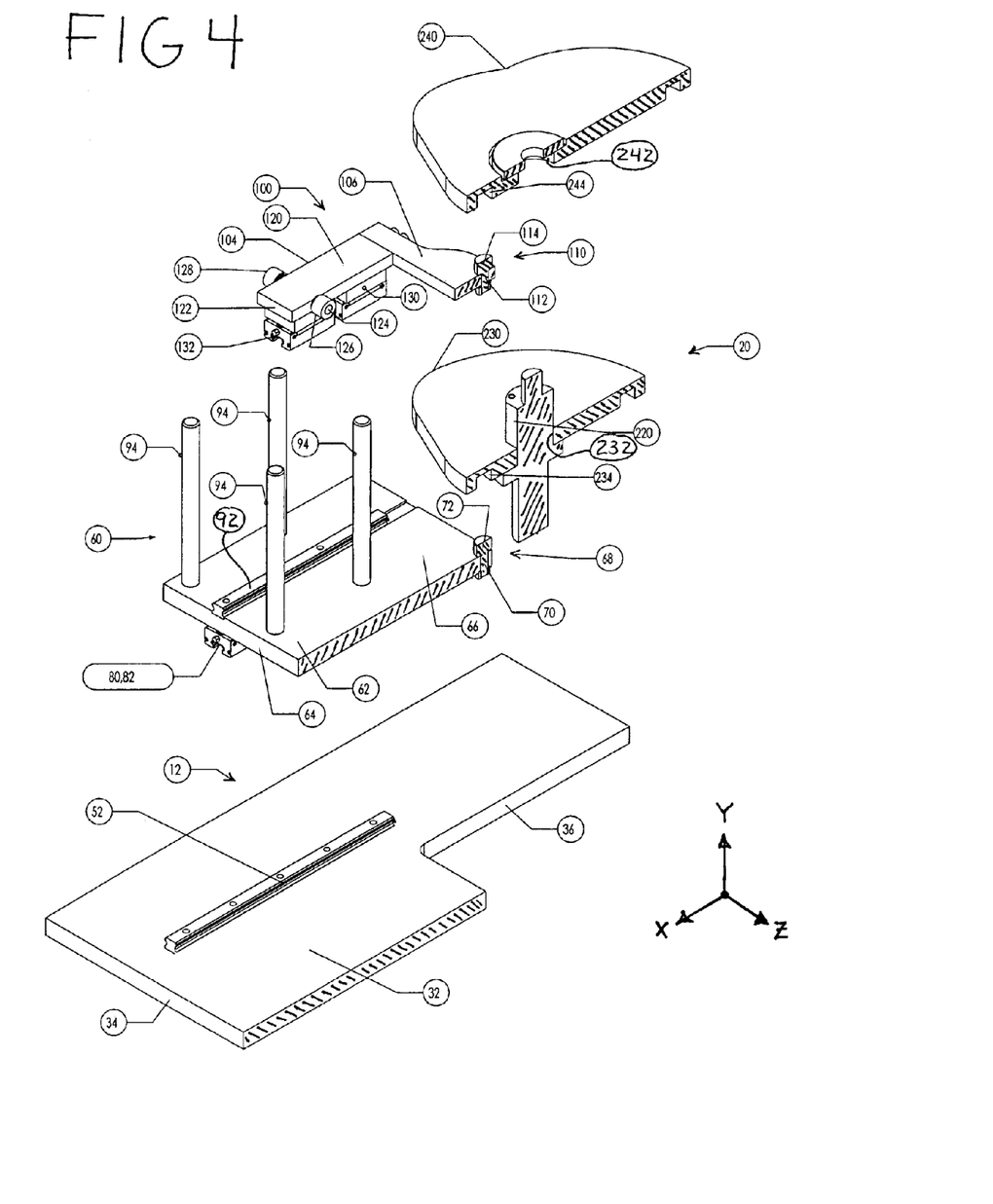

Continuing on, the first or upper surface 62 of the platform 60 also includes one or more rails 90, 92 that are parallel to the rails 50, 52 of the base 30, and like the base rails, the platform rails extend from the front end to the rear end of the apparatus. As will be discussed later, the rails 90, 92 (which are received in and secured to respective slots in the upper surface 62 of the platform 60) are configured and arranged to receive and support a movable bracket 100. As best seen in FIGS. 2c and 4, the platform 60 includes a rear extension 66 to which a groove engagement element 68 is attached. The groove engagement element 68 comprises a vertically oriented axle or shaft 70 that rotatably supports a follower 72 (shown in phantom).

Preferably, the follower 72 is a wheel that is rotatably mounted on the vertical axle or shaft 70. The platform 60 also includes a plurality of guide pins 94. The guide pins 94 are substantially vertically aligned, parallel, and are configured to slidably receive and position the transfer units 16, 18 so that they are able to be vertically displaced and move up and down relative to the platform 60.

Referring now to FIGS. 1b, 2a and 2c, The movable bracket 100 is generally U-shaped and includes a first arm or strut 102, a second arm or strut 104, a cross bar or yoke 106 that connects the first arm to the second arm (see also, FIG. 2b). More particularly, as shown in FIGS. 2b and 4, each arm or strut 102, 104 has an upper surface 120, a lower surface 122, opposing sides, a front end and a rear end. Each arm or strut 102, 104 also includes at least one downwardly depending flange 130 that has at least one rail engagement member 132 similar to the rail engagement members of the platform 60, as discussed above. That is, the rail engagement members 132 are configured and arranged to ride upon the rails 90, 92 of the platform 60 as the bracket 100 is moved back and forth relative thereto. As with the rail engagement members 80, 82 of the platform 60, the rail engagement members 132 of each arm or strut of the bracket 100 are bearings or friction reducing materials that permit the bracket 100 to move smoothly relative to the platform 60. Some the rail engagement members 132 may include linear bearings or material that functions in a similar manner, such as nylon strips and/or lubricants. Each arm or strut 102, 104 may also include at least one horizontally aligned and transversely oriented axle or shaft 124, which can support one or more drive members 126, 128. Preferably, each drive member 126, 128 is a wheel that is rotatably mounted at the ends of the horizontal axle or shaft 124, and they are positioned adjacent the opposing sides of each arm 102, 104.

The cross bar or yoke 106 is connected to the rear ends of each arm 102, 104 and spaces them apart from each other in a generally parallel relation so as to form the arms of a generally shaped "U". As best seen in FIGS. 2b and 4, the cross bar or yoke 106 includes a rearwardly and centrally located portion to which a groove engagement element 110 is attached. The groove engagement element 110 can include elements such as a vertically oriented axle or shaft 112 that rotatably supports a follower 114. Preferably, the follower 114 is a wheel that is rotatably mounted on the vertical axle or shaft 110 (as shown in phantom in FIG. 2b).

Figure 3A:
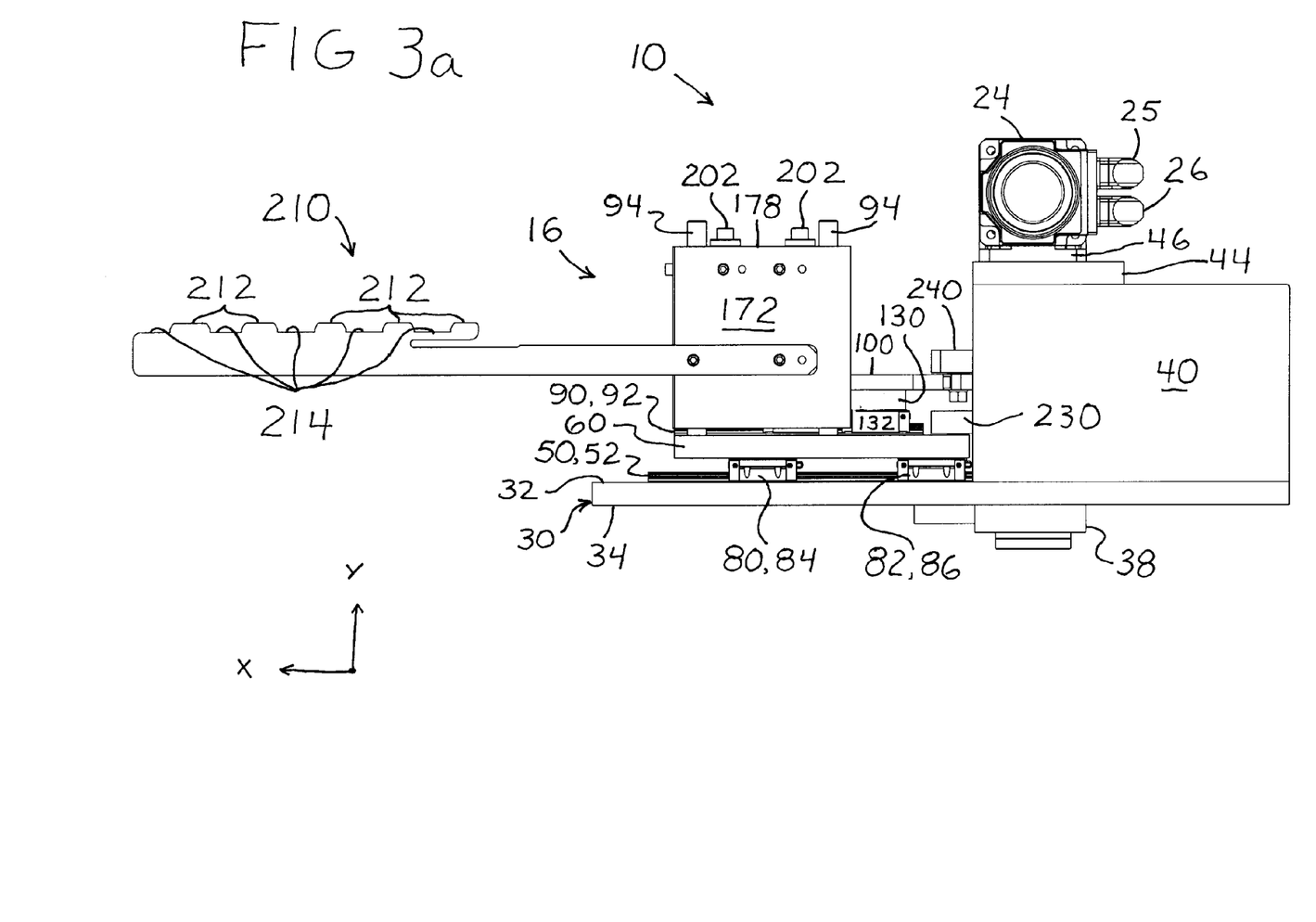
Figure 3B:
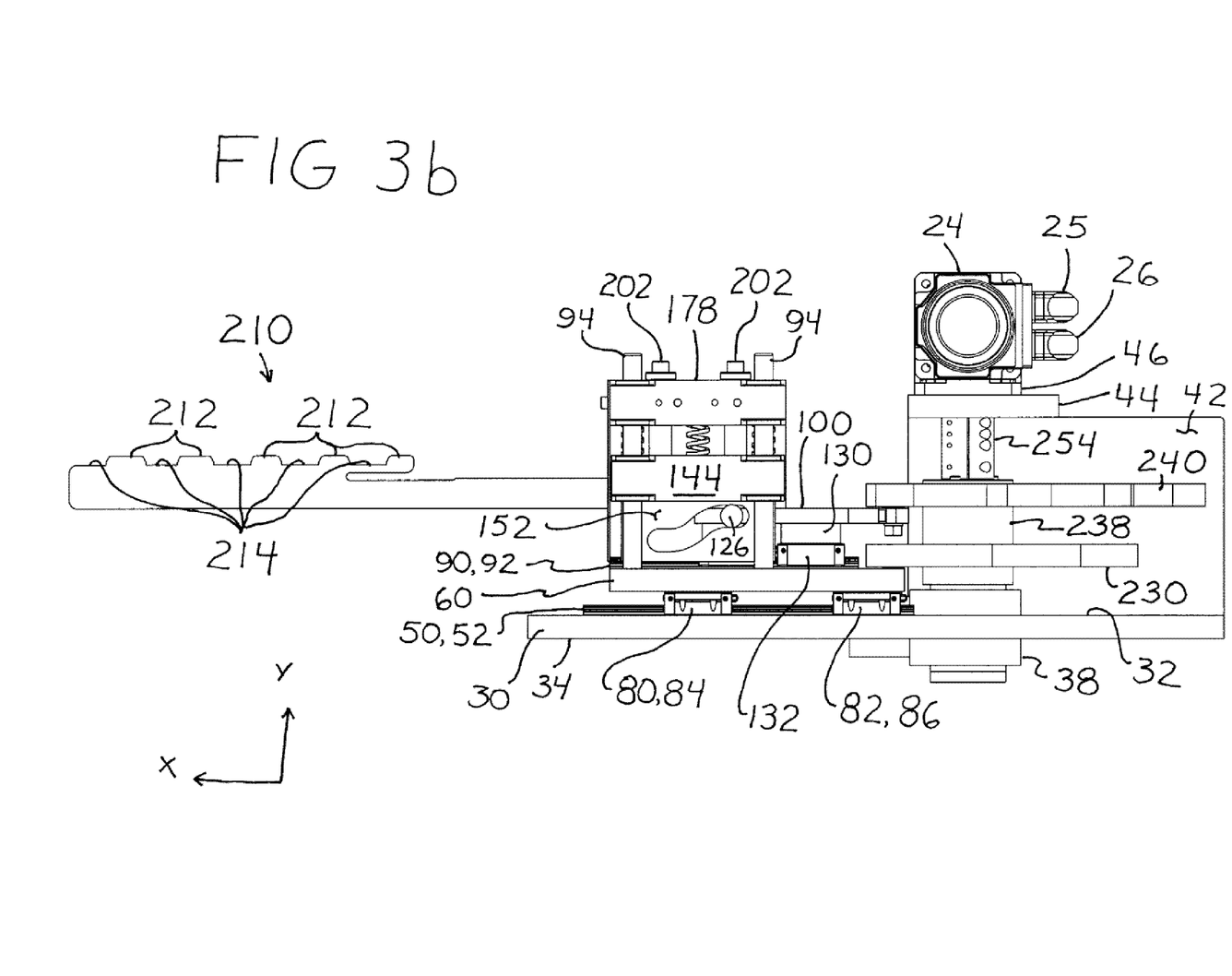
FIG. 3b is a side elevational view of FIG. 3a showing inner components of the apparatus.

In operation, the movable bracket 100 is juxtaposed so that it resides above the platform 60 and when the bracket 100 and the platform 60 are moved by the drive assembly 20, their motions are reciprocal and substantially parallel to each other (see FIGS. 3a and 3b, which show the elevational relationship between the base 30, the platform 60 and the bracket 100). It will be understood and appreciated that the movements of the platform 60 and the bracket 100 are not necessarily uniform in terms of travel distances and speeds and will differ because the first 230 and second 240 cams can have differently shaped groove profiles (see, for example, FIGS. 1c, 2b and 2c).

Figure 5:
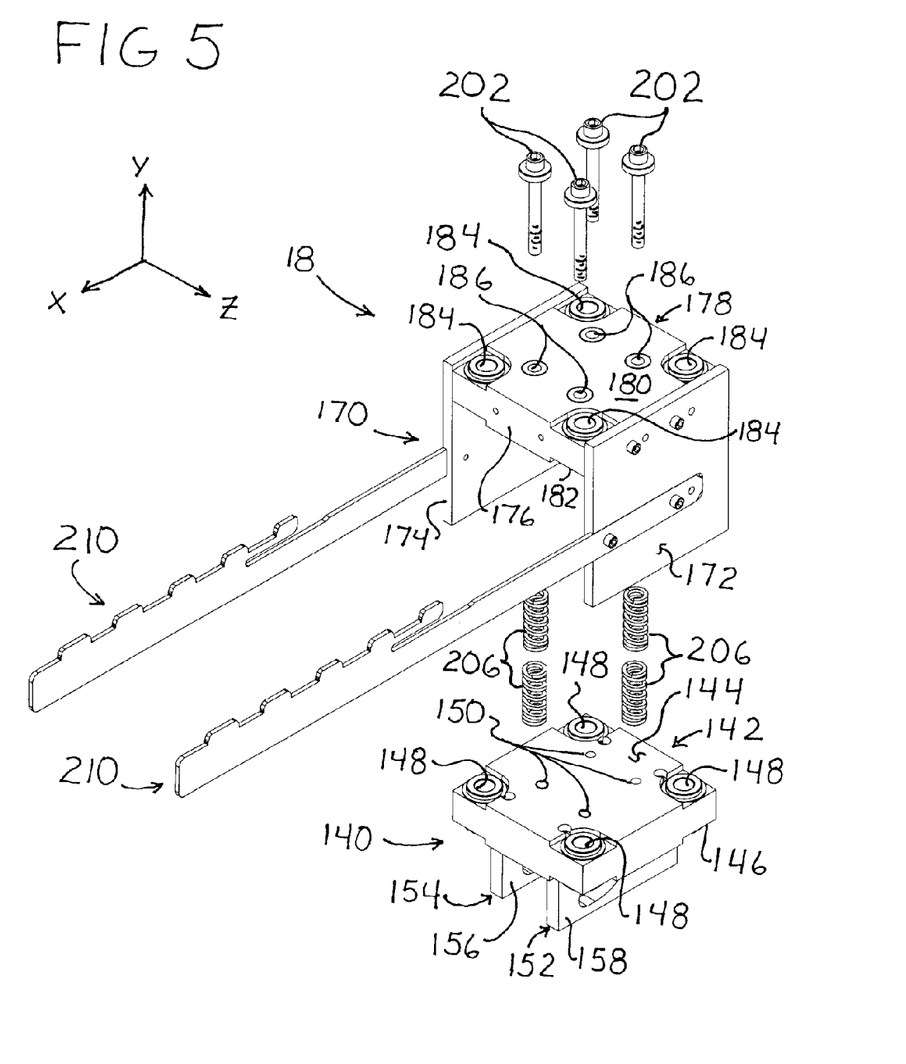

Each arm or strut 102, 104 of the bracket 100 is configured and arranged so that it is able to elevate a table 140. In some embodiments, each table 140 may include elements such as a generally planar and horizontally oriented body or plate 142 having an upper surface 144, a lower surface 146, opposing sides, a front end and a rear end. Each body or plate 140 may include elements such as two sets of vertically oriented apertures 148, 150 that extend therethrough. Each of the two sets of apertures 148, 150 has a different function and is arranged in a different pattern. The apertures 148 of the first set are generally located at the corners of the body 140 and are used to slidably receive the vertical guide pins 94 that are attached to the platform 60 at locations 95, which may be, for example, weld points or threaded apertures (see, FIGS. 2c, 5a, 5b and 7a). The apertures 148 are sized so that they can accommodate the reciprocal vertical displacement of the table 140 that occurs relative to the platform 60 when the transfer apparatus 10 is in operation. Optionally, the first set of apertures 148 may be provided with bushings to facilitate movement between the table 140 and the guide pins 94. The apertures 150 of the second set are internally threaded, located inwardly from the first set of apertures, and form part of a moveable connection between the table 140 and a transfer unit 16 or 18. It will be understood, that the location and arrangement of each set of apertures 148, 150 may be reversed or otherwise rearranged without departing from the spirit and scope of the invention. Likewise, the number of apertures in each set may also be varied.

Figure 6A:
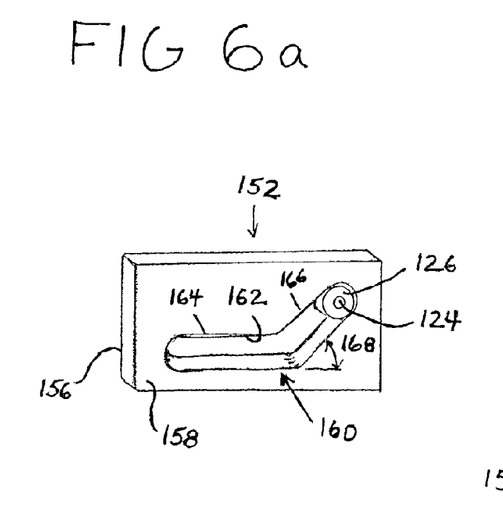
FIG. 6a is a perspective view of an illustrative embodiment of a side wall that may be used in the table assembly of the transfer apparatus.
Figure 6B:
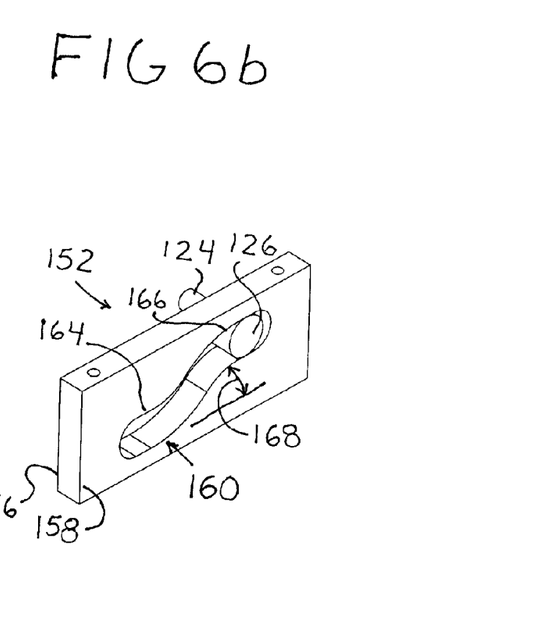
FIG. 6b is a perspective view of another illustrative embodiment of a side wall that may be used in the table assembly of the transfer apparatus.

Referring now to FIGS. 6a and 6b, each table 140 also includes first and second walls 152, 154 that depend downwardly from the body 140 so as to form an upwardly extending channel that extends between the front and rear ends of the body 140, and which is able to movably receive a respective arm or strut 102, 104 therebetween. Each of the walls 152, 154 includes a bottom that can support the table 140 when the table is in a first, elevated position. Each of the side walls 152, 154 includes one or more surfaces 160 that are transverse to the longitudinal axis of the wall (i.e. along the z direction in a conventional three-dimensional coordinate system), with the surfaces configured to be engaged by a respective drive member as it moves back and forth. Preferably, the transverse surfaces 160 of the side walls are in the form of slots 162 that extend from the front to the rear of each of the walls 152, 154, with the slots 162 of the walls of each table configured to receive left and right drive members 126, 128 of each arm (see, for example, FIGS. 3b, 6a, 6b, 7a and 7c). Each slot 162 comprises two substantial linear portions 164, 166, which are connected to each other and which define an angle 168 therebetween. Preferably, the angle 168 defined by the slot portions 164, 166 has a range of approximately 5 degrees to approximately 65 degrees. It will be understood that different slot configurations, as exemplified by FIGS. 6a and 6b, may be used to achieve different cyclical movements. As will be appreciated, the walls 152, 154 need not have slots that extend transversely all the way through the walls in order to operate as intended. The transverse surfaces could be in the form of linear recesses instead of slots. As shown, the slots 160 define a vertically variable path from the front to the rear of each wall that allows the table 140 to be lifted and vertically displaced in a reciprocal manner from the first, elevated position where the table is supported by the platform 60, to a second, elevated position that located above the platform 60 as a strut (through the cross bar and its rear extension) is moved back and forth by the second cam 240.

Figure 7A:
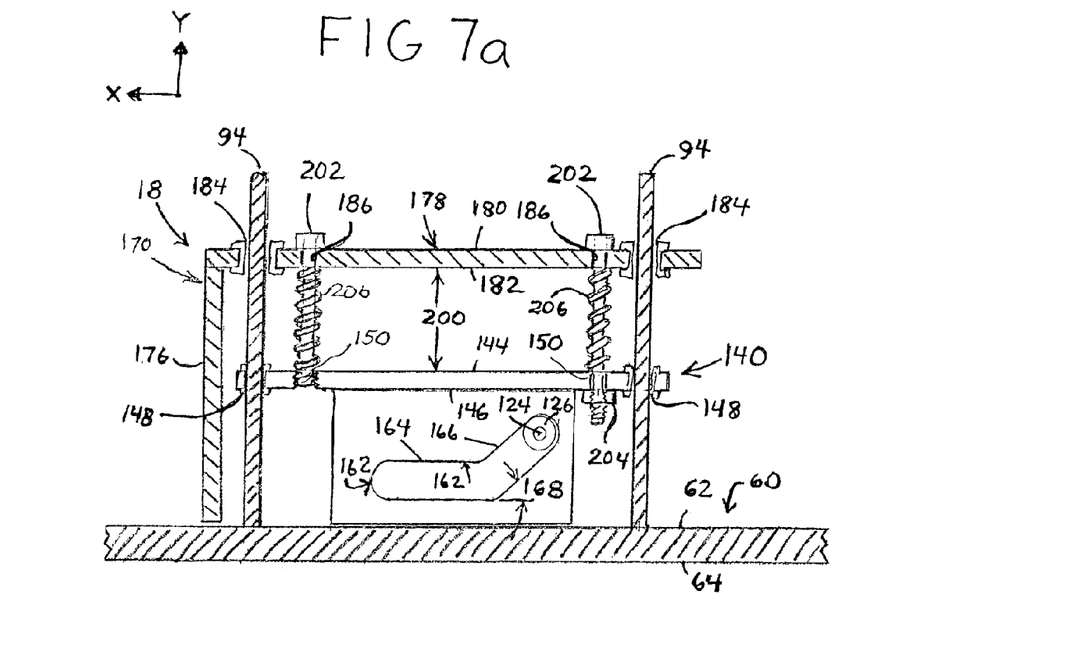

As the table 140 is vertically displaced by the drive members 126, 128 of a strut or arm, the table 140 engages a transfer unit 16, 18 to which it is operatively connected. As shown in FIGS. 5 and 7a, a table 140 is not directly connected to a transfer unit 16 or 18. Instead, there is a movable connection between table and the transfer unit. This movable connection comprises one or more shoulder bolts 202 that extend between the table body 142 and the top wall 178 of the transfer unit 170, and one or more resilient elements 206 that are interposed between a gap 200 formed between the upper surface 144 of the table body 140 and the lower surface 182 of the top wall 179 of the transfer unit 170 (see FIGS. 5 and 7a). Preferably, the resilient elements 206 are compression springs that are slid over the bolts during assembly, however also configurations and arrangements are possible without departing from the spirit and scope of the invention. Note that after the bolts 202 have been connected to the body 142, the resilient elements 206 will always be under compression. The movable connection is desirable as a safety feature because it protects the transfer bars 210 from becoming damaged in case normal operation of the apparatus is interrupted or prevented. As will be discussed later, the shoulder bolts 202 of the movable connection extend from the second set of apertures 186 of the top wall 178 of the transfer unit 170 to the second set of apertures 150 of the table body 140 (again, see FIGS. 5 and 7a). Preferably, the resilient elements 206 are coil springs or their equivalents, for example, elastic snubbers, dash-pots, dampers, etc.

Generally, transfer units 16, 18 are identically shaped and only one transfer unit will be discussed in detail. Each transfer unit has a generally box-shaped housing or enclosure 170 that includes side walls 172, 174, a front 176, and a top wall 178. The top wall 178 includes an upper surface 180, a lower surface 182 and a plurality of apertures that extend therethrough. As shown, there are two sets of apertures 184, 186 that have different functions and which are arranged in different patterns (see, FIGS. 5 and 7b). The apertures 184 of the first set are generally located at the corners of the top wall 178 and are used to slidably receive the vertical pins 94 that are attached to and which extend vertically from the platform 60. Preferably, the pins 94 are sized so that they can accommodate the reciprocal vertical displacement of the transfer unit that occurs relative to the platform 60 when the transfer apparatus is in operation (see, FIGS. 4, 5 and 7a).

The apertures 186 of the second set are generally located inwardly from the apertures 184 of the first set. The apertures 186 of the second set are used to operatively connect a transfer unit to a table 140. To that end, the apertures 186 of the second set are configured to slidably receive downwardly depending shoulder bolts 202, which are substantially parallel with each other and which include threaded ends that are received in the second set of apertures 150 in the table body 142 located below and parallel to the top wall 178 (see, FIG. 7a). The apertures 150 are preferably provided with internal threads that are sized to receive the threaded ends of the bolts 202 so that they may be connected directly to the table body 142, as depicted in FIG. 5 and the left side of FIG. 7a. Alternatively, the apertures 150 may be sized to slidably receive the bolt ends and secured with nuts 204 adjacent the lower surface 146 of the body 140, as depicted in FIG. 5 and the right side of FIG. 7a. As discussed above, a gap 200 is formed between the lower surface 182 of the top wall 178 and the upper surface 144 of the table body 142, with the gap 200 serving to provide operating space for the movable connection between a table and a transfer unit (also discussed above).

Figure 7B:
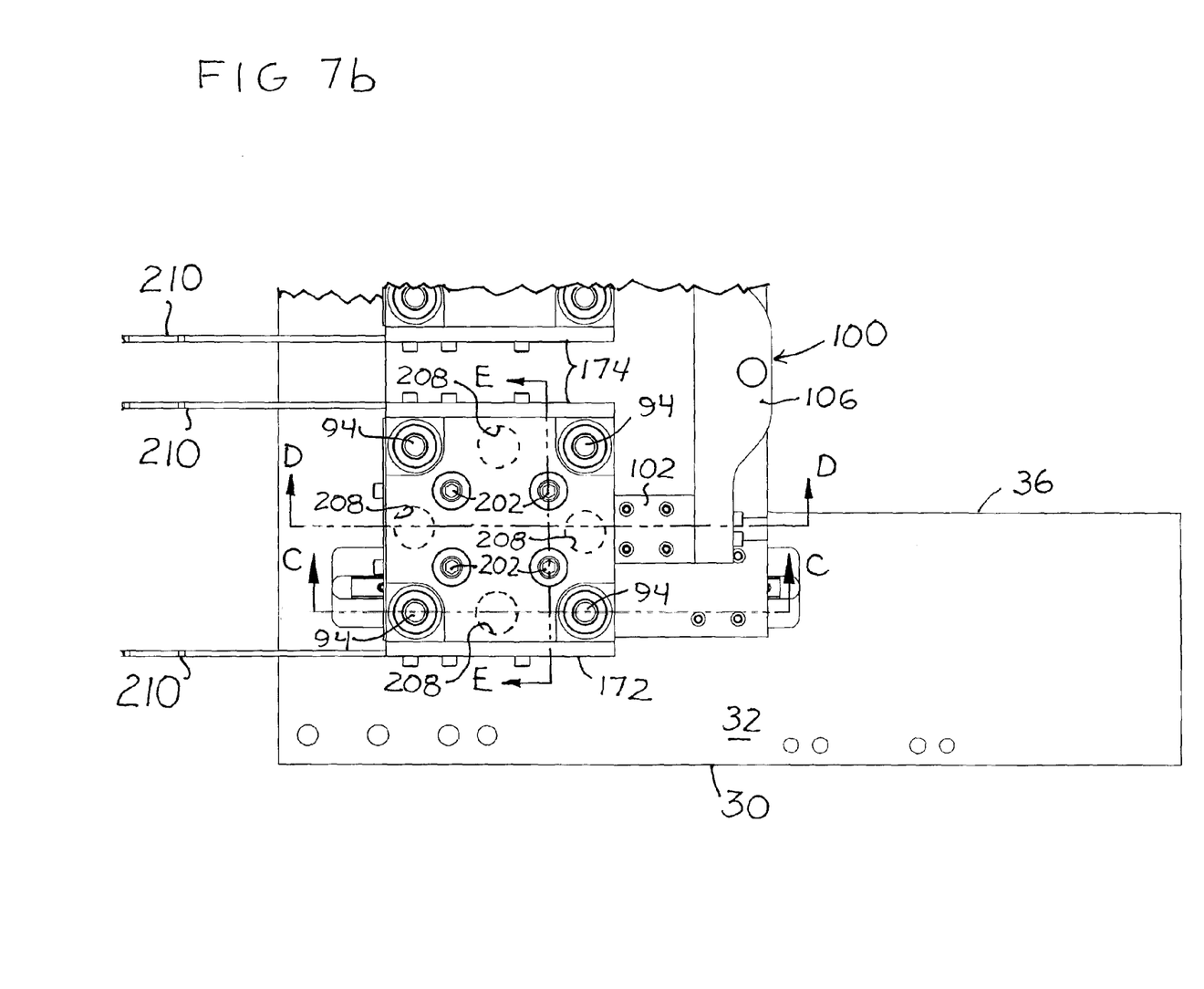
FIG. 7b is a partial top plan view of an illustrative embodiment of a housing unit.
Figure 7C:
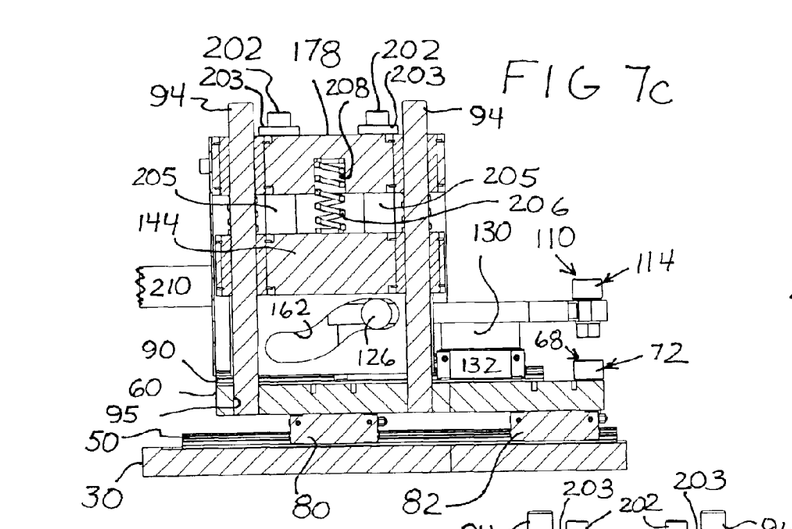
FIG. 7c is a partial, cross-sectional, side elevation view of the housing unit of FIG. 7b, taken along line C-C.
Figure 7D:
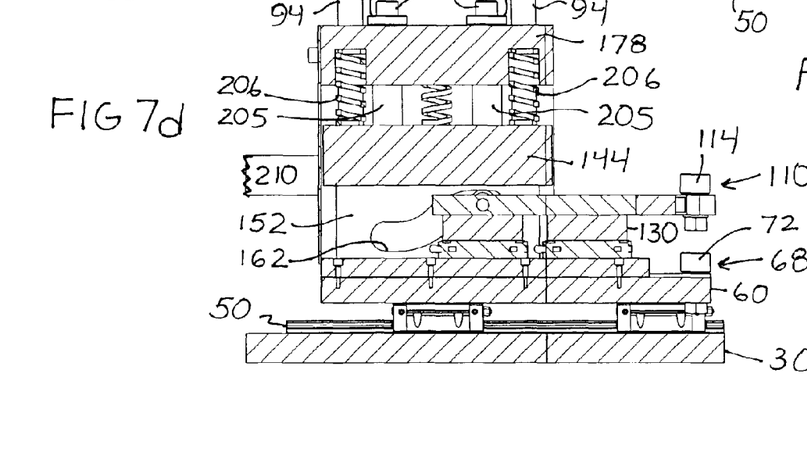
FIG. 7d is a partial, cross-sectional, side elevation view of the housing unit of FIG. 7b, taken along line D-D; and, FIG. 7e is a partial, cross-sectional, side elevation view of the housing unit of FIG. 7b, taken along line E-E.
Figure 7E:
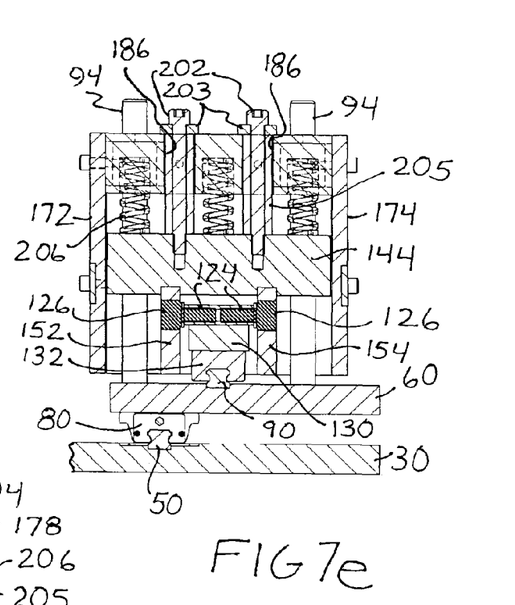

Another illustrative embodiment of a transfer unit arrangement is shown in FIGS. 7b-7e. In this embodiment, the arrangement of the bolts 202 and the spring elements differs from the previously described embodiment. In this illustrative example, an aperture 186 may be provided with a sleeve 205 that extends from the top wall 178 to the table 144 therebelow, with the sleeve 205 movably retained by the aperture 186. A washer 203 may be positioned on top of the upper end of the sleeve 205 and a bolt 202 may be inserted into the sleeve and threaded into the table 144 therebelow. When the bolt 202 is tightened, the table 144, the bolt 202, the sleeve 205 and the washer 203 are able to move vertically in response to the movement of the drive members 124, 126 against the slotted side walls 152, 154 that support the table 144. This embodiment also may include spring elements 206 that are arranged in a different manner that previously described. Here, the transfer unit may include spring elements that may be positioned in locations other than locations that are concentric with the bolts 202 or guide pins 94. For example, a spring element 206 may be positioned in line with two guide pins. Or, a plurality of spring elements 208 may be positioned in a pattern that is generally 45 degrees from the patterns of the guide pins and/or the bolts 202. Additionally, some embodiments of top walls 178 may include one or more upwardly extending cavities 208 that are able to receive an end of a spring element 206. As best shown in FIG. 7b, the top wall 178 may include a plurality of cavities 208 (see also FIGS. 7c and 7d). As will be appreciated, the cavities may instead be provided in table 144, in which case they would extend downwardly. Alternatively, it will be appreciated that both the top wall 178 and the table 144 may be provided with cavities, if desired.

Transfer bars 210 are attached to the side walls 172, 174 of each transfer unit housing 170. The transfer bars 210 are substantially parallel, horizontal, and they extend forwardly, preferably beyond the front 176 of the transfer unit housing 170. The transfer bars 210 include notched, upwardly facing surfaces that are used to assist in engaging an item or a plurality of items to be moved. More particularly, the notches of each transfer bar 210 are defined by a plurality of alternating elevated lands 212 and floors 214. Preferably, each notch is configured so that it supportively cradles an item as the transfer bar is moved from a starting position (at the first elevated position and the first horizontal position) to a mid-cycle position (at the second elevated position and the second horizontal position). When the transfer bar 210 completes the cycle and moves from the mid-cycle position back to the starting position, the notch is disengaged from the item. Each transfer bar 210 includes a plurality of notches that allow an item (or items) to be advanced in a series of steps, with the horizontal component of each step corresponding to the horizontal distance between adjacent notches, and with the vertical component of each step corresponding to the vertical depth of the notch. It will be appreciated and understood that the shape of the notches need not be angular and that they may be formed in different shapes without departing from the spirit and scope of the invention.

The platform 60 and the bracket 100 are operatively connected, through respective followers 72, 114 to a drive assembly 20. The drive assembly 20 includes a rotatable shaft 220 with opposing ends, and two generally planar cams 230, 240 that are attached to the shaft 220. The shaft 220 is rotatably attached to the frame 30 by a lower bearing mount 38 and by means of a lock collar 254 that is adapted to be coupled to a shaft that extends from an upper bearing mount that is included in the right angle gearbox 46. As will be appreciated, the bearing mounts of the shaft 220 are adjustable relative to the front and rear ends of the frame 30 so that different sized cams can be accommodated. One end of the shaft 220 is connected to a motive source 24 by way of the right angle gearbox 46. As depicted, the motive source 24 is an electric servo motor that includes connection points 25 and 26. Again, examples of commercially available gearboxes and electric servo motor that may be used with some of the embodiments of this apparatus are the Bayside RS90 right angle, and the Parker MPP0922R, both of which are manufactured by the Parker Hannifin Corporation, of Cleveland, Ohio. It will be appreciated that other motive sources may be used without departing from the spirit and scope of the invention. For example, the servo-motor and gearbox could be replaced with an AC or DC motor or an air driven motor. However, a servo-motor is preferred because it is adjustable over different portions of the work cycle.

The lower and upper cams 230, 240 are generally transversely oriented to the rotational axis of the shaft 220 and are removably attached to the shaft via apertures 232 and 242 in a conventional manner, such as keyways, flats, locking collars with set screws, or the like. Spline connections between the shaft and the cams could also be utilized, if desired. In some embodiments, the cams 230, 240 may be provided with an element such as a spacer 238 that provides an axial distance therebetween so that a follower can engage the upper cam 240 from a position below the cam. In some embodiments, the cams 230, 240 and the spacer 238 may be secured to the shaft by a washer 250 and fastening elements 252 (see, for example, FIGS. 1b and 1c). As best shown in FIG. 1c, the generally planar cams 230, 240, include follower engagement portions that take the form of radial grooves 234, 244, with the grooves sized to receive respective followers 72, 114 of the platform 60 and the bracket 100. As will be understood, the radial groove 234, 244 of each cam 230, 240 defines a profile that controls the movement of a respective follower 72, 114. It will be appreciated that the profiles of the cam grooves could be substantially the same, or they could be substantially different. Moreover, some profile segments of the cams could be the same and some profile segments of the cams could be different, depending upon the particular speeds and directions that are necessary or desired to move an item from a first location to a second location. As will also be appreciated, the speeds and directions may be dictated, for example, by physical limitations of the item, time constraints, or distance between the first and second locations. For example, the first and second grooves of the cams can be designed so that during a single rotation of the shaft, the transfer apparatus is able to be initially displaced from a first vertical position to a second vertical position, then moved from a first horizontal position to a second horizontal position, then moved from the second vertical position to the first vertical position, and finally moved from the second horizontal position to the first horizontal position. It will be appreciated and understood that the vertical displacement of the transfer unit is achieved by interaction of the drive member and the table, which translates horizontal motion into vertical motion. Other motions can be obtained by varying the groove profiles and the transverse driver engagement surfaces of the tables. While the apparatus may be used primarily in the operation of transfer dies used in metal stamping applications, it is envisioned that it will have utility where quick and accurate movement and positioning is required.

The foregoing is considered as illustrative only. Furthermore, since numerous modifications and changes will readily occur to those skilled in the art, the exact construction and operation shown and described is only an example of a preferred embodiment. The invention is defined by the following claims.

What is claimed is:

1. A transfer apparatus comprising:
   a horizontally oriented and reciprocally movable platform;
   a table movably connected to the platform, the table including a generally vertical flange with a transverse surface that extends from a front end of the flange to a rear end of the flange, the table displaceable in a vertical direction relative to the platform;
   a bracket having a drive member connected thereto, with the drive member configured and arranged to engage the transverse surface of the flange;
   a vertically oriented rotatable shaft;
   first and second cams, each cam connected to the shaft and rotatable wherewith;

a first extension operatively connecting the first cam to the platform; and a second extension connected to the bracket, the second extension operatively connecting the second cam to the drive member such that the drive member is able to engage the transverse surface of the flange of the table;

wherein rotation of the shaft rotates the first and second cams to reciprocally drive, through the first and second extensions, the platform and the table so that the table is able to move vertically and horizontally.

2. The transfer apparatus of claim 1, wherein the first cam comprises a face groove cam, and wherein the first extension comprises an engagement element that rides within the groove.

3. The transfer apparatus of claim 1, wherein the second cam comprises a face groove cam, and wherein the second extension comprises an engagement element that rides within the groove.

4. The transfer apparatus of claim 1, wherein the the bracket comprises a strut, wherein the drive member is connected to the strut, and wherein the drive member is operable to provide a lifting force to the table.

5. The transfer apparatus of claim 1, wherein the transverse surface extends from a lower end of the flange to an upper end of the flange.

6. The transfer apparatus of claim 1, further comprising a transfer unit that is movably connected to the platform, wherein the transfer unit is vertically displaceable to an elevated position located above the platform.

7. The transfer apparatus of claim 6, wherein the transfer unit is operatively connected to the table, wherein the table moves the transfer unit to the elevated position located above the platform.

8. The transfer apparatus of claim 7, further comprising a transfer bar connected to the transfer unit, the transfer bar operable to move an item from a first location to a second location.

9. An apparatus for transferring an article from a first location to a second location, the apparatus comprising:
   a base defining a generally horizontal upper reference surface and at least one horizontal guide rail attached thereto;
   a platform that is supported by and which is movable along the guide rail, the platform having an upper surface with at least one horizontal guide rail attached thereto;
   a table having a top, a bottom and a length, with the table movably connected to the platform and able to reciprocally move in a generally vertical direction relative thereto, with the bottom of the table including a drive member engagement surface;
   a first cam having a radial groove and a transverse aperture, with the first cam oriented so that the transverse aperture is generally vertically aligned;
   a second cam having a radial groove and a transverse aperture, with the second cam oriented so that the transverse aperture is generally vertically aligned with the aperture of the first cam;
   a rotatable shaft connected to the first and second cams at their respective apertures;
   a first follower that operatively connects the groove of the first cam to the platform; and
   a second follower that operatively connects the groove of the second cam to the drive member engagement surface of the table;
   wherein rotation of the shaft causes the first and second cams to reciprocally move the first and second followers, and wherein the first and second followers move the table and platform in their respective linear directions.

10. The apparatus of claim 9, wherein the drive member engagement surface of the table is vertically variable along the length of the table.

11. The apparatus of claim 9, wherein the second follower is connected to a strut having a drive member.

12. The apparatus of claim 11, wherein the drive member comprises a rotatable wheel.

13. The apparatus of claim 12, wherein the rotatable wheel is connected to a horizontally oriented shaft.

14. The apparatus of claim 9, further comprising a transfer unit that is movably connected to the platform, wherein the transfer unit is vertically displaceable to an elevated position located above the platform.

15. The apparatus of claim 14, wherein the transfer unit is operatively connected to the table, wherein the table moves the transfer unit to the elevated position above the platform.

16. The apparatus of claim 15, wherein the transfer unit includes a top wall with a lower surface, wherein the table includes an upper surface, and wherein at least one spring element is positioned between the lower surface of the top wall and the upper surface of the table.

17. A transfer apparatus comprising:
   a horizontally oriented and reciprocally movable platform;
   a table movably connected to the platform, the table including a generally vertical flange with a slot that extends from a front end of the flange to a rear end of the flange with the table displaceable in a vertical direction relative to the platform;
   a vertically oriented rotatable shaft;
   first and second cams, each cam connected to the shaft and rotatable wherewith;
   a first extension operatively connecting the first cam to the platform; and
   a second extension operatively connecting the second cam to a transversely oriented drive member to such that the drive member is able to engage the slot of the flange;
   wherein rotation of the shaft rotates the first and second cams to reciprocally drive, through the first and second extensions, the platform and the table so that the table is able to move vertically and horizontally.

18. The transfer apparatus of claim 17, wherein the slot extends from a lower end of the flange to an upper end of the flange.

19. A transfer apparatus comprising:
   a horizontally oriented and reciprocally movable platform;
   a table movably connected to the platform, with the table displaceable in a vertical direction relative to the platform;
   a transfer unit movably connected to the platform, with the transfer unit vertically displaceable to an elevated position located above the platform;
   a vertically oriented rotatable shaft;
   first and second cams, each cam connected to the shaft and rotatable wherewith;
   a first extension operatively connecting the first cam to the platform; and
   a second extension operatively connecting the second cam to the table;
   wherein rotation of the shaft rotates the first and second cams to reciprocally drive, through the first and second extensions, the platform and the table so that the table and the transfer unit are able to move vertically and horizontally.

20. The transfer apparatus of claim 19, wherein the table includes a vertically oriented flange and the second extension comprises a strut with a drive member connected thereto, wherein the drive member movably engages the flange.

21. The transfer apparatus of claim 19, wherein the table includes a body, wherein the transfer unit includes a top wall, and wherein the top wall of the transfer unit is located above a the body of the table.

22. The transfer apparatus of claim 21, further comprising a spring element that is interposed between the body of the table and the top wall of the transfer unit.

23. The transfer apparatus of claim 19, wherein the table and the transfer unit are movably connected to the platform by at least one vertically oriented guide pin.

24. The transfer apparatus of claim 19, wherein the table and the transfer unit are movably connected to each other.

* * * * *